(12) United States Patent
Ventura et al.

(10) Patent No.: US 9,381,996 B2
(45) Date of Patent: *Jul. 5, 2016

(54) SPLIT BLADE RETENTION RACE WITH INNER AND OUTER CHAMFERS

(71) Applicant: Hamilton Sundstrand Corporation, Windsor Locks, CT (US)

(72) Inventors: Peter Ventura, Enfield, CT (US); Matthew C. Soule, Granby, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 555 days.

This patent is subject to a terminal disclaimer.

(21) Appl. No.: 13/890,446

(22) Filed: May 9, 2013

(65) Prior Publication Data

US 2014/0334932 A1 Nov. 13, 2014

(51) Int. Cl.
*B64C 11/06* (2006.01)
*B64C 11/04* (2006.01)

(52) U.S. Cl.
CPC ..................................... *B64C 11/04* (2013.01)

(58) Field of Classification Search
CPC ......... B64C 11/04; B64C 11/06; F16C 19/06; F16C 19/163; F16C 33/583; F16C 33/585; F16C 33/60; F16C 2326/43
USPC .......... 416/205, 214 A, 214 R, 129; 384/499, 384/501, 505, 506, 570
See application file for complete search history.

(56) References Cited

U.S. PATENT DOCUMENTS

| | | | | |
|---|---|---|---|---|
| 2,704,129 | A | * 3/1955 | Cushman | B64C 11/06 416/205 |
| 4,141,664 | A | 2/1979 | Moran et al. | |
| 4,850,801 | A | 7/1989 | Valentine | |
| 5,118,256 | A | 6/1992 | Violette et al. | |
| 7,845,910 | B2 | 12/2010 | Talasco et al. | |
| 8,784,063 | B2 * | 7/2014 | Ventura | B64C 11/04 416/205 |
| 2007/0041839 | A1 | 2/2007 | Carvalho | |
| 2009/0220344 | A1 | 9/2009 | Pfeiffer et al. | |

* cited by examiner

*Primary Examiner* — Craig Kim
*Assistant Examiner* — Maxime Adjagbe
(74) *Attorney, Agent, or Firm* — Cantor Colburn LLP

(57) ABSTRACT

A blade shank assembly for an aircraft propeller blade includes a blade shank; and a split blade retention race encircling the blade shank, the split blade retention race comprising two sections separated by two splits, the two splits being perpendicular to a race surface of the split blade retention race, wherein the split blade retention race comprises: an inner chamfer located between a surface of the split blade retention race that is adjacent to the blade shank and a split surface of the split blade retention race at each of the two splits; and an outer chamfer located between the race surface of the split blade retention race and the split surface at each of the two splits.

20 Claims, 6 Drawing Sheets

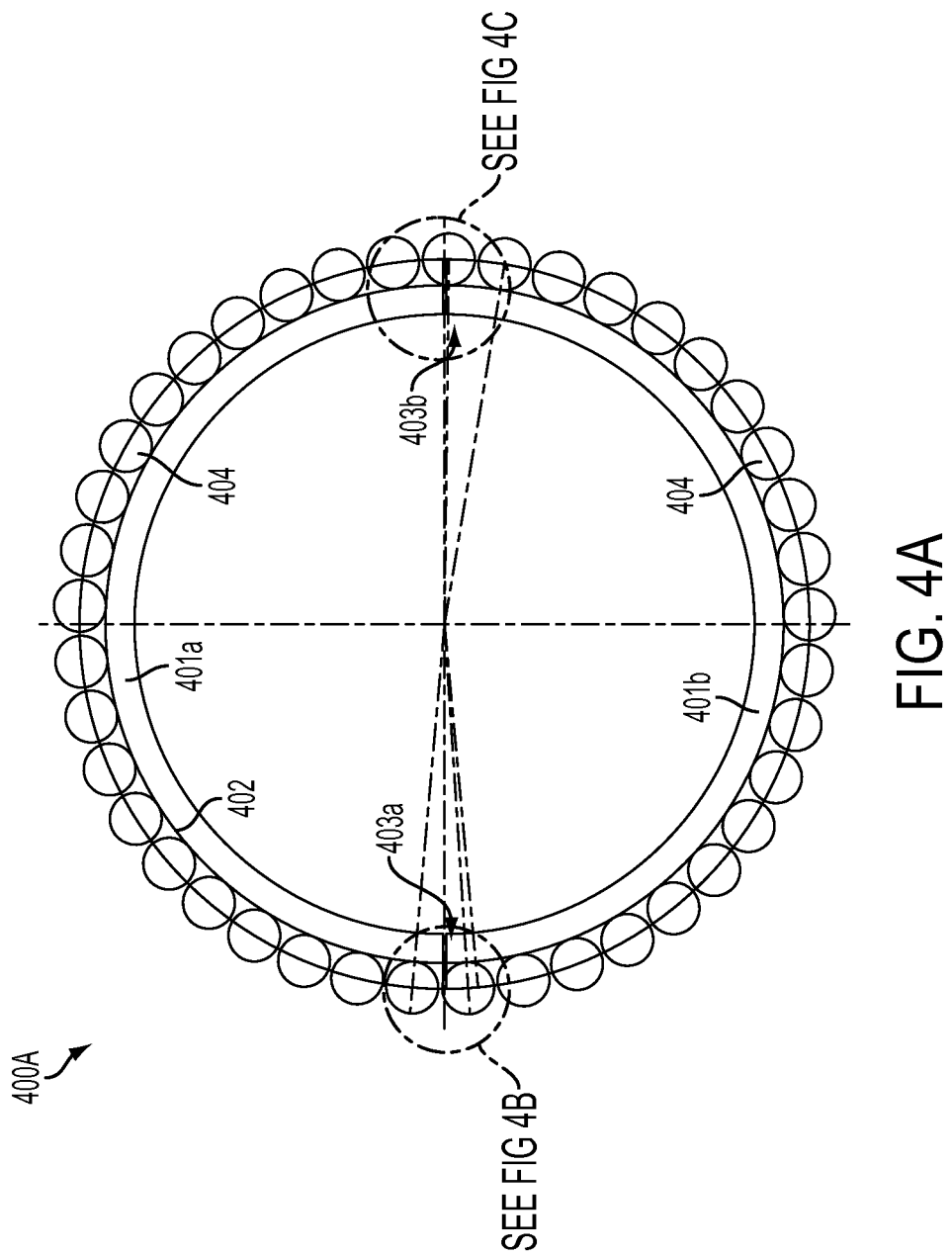

SPLIT BLADE RETENTION RACE WITH INNER AND OUTER CHAMFERS

BACKGROUND

The subject matter disclosed herein relates generally to the field of a split blade retention race for an aircraft propeller blade.

A propeller for use in an aircraft includes a central rotating hub having a plurality of blade receiving sockets disposed about the hub. The propeller blades each have a shank, which may be a metal such as aluminum, located at the base of each propeller blade, and each shank is disposed in a respective blade receiving socket. The blade receiving sockets and the blade shanks are provided with opposed, separated ball bearing race surfaces, and a plurality of ball bearings are held between the blade receiving socket and the blade shank on the race surfaces, allowing adjustment of the pitch of the blade. The ball bearing race on the blade shank may be a separate component, referred to as a blade retention race, that encircles the blade shank. Currently, the blades are shipped with a one piece blade race.

Due to the movement and loading of the ball bearings on the race surface, and resulting damage that occurs to the race, one piece races may be replaced by split races at overhaul. Such a multisection blade retention race may be referred to as a split blade retention race. Once the one-piece race is replaced by split races, the movement and loading of the ball bearings on the edges of the split races has a tendency to damage the blade shank beyond repair.

BRIEF SUMMARY

According to one aspect, a blade shank assembly for an aircraft propeller blade includes a blade shank; and a split blade retention race encircling the blade shank, the split blade retention race comprising two sections separated by two splits, the two splits being perpendicular to a race surface of the split blade retention race, wherein the split blade retention race comprises: an inner chamfer located between a surface of the split blade retention race that is adjacent to the blade shank and a split surface of the split blade retention race at each of the two splits; and an outer chamfer located between the race surface of the split blade retention race and the split surface at each of the two splits.

According to another aspect, a split blade retention race for a blade shank assembly for an aircraft propeller blade includes a race surface; an inner surface, the inner surface being configured to be located adjacent to a blade shank in the blade shank assembly; a split surface, the split surface being perpendicular to the race surface and to the inner surface; an inner chamfer, wherein the inner chamfer is angled back from the split surface to the inner surface; and an outer chamfer, wherein the outer chamfer is angled back from the split surface to the race surface.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES:

FIG. 4A illustrates a top view of an embodiment of a split blade retention race.

DETAILED DESCRIPTION

Embodiments of a split blade retention race with inner and outer chamfers are provided, with exemplary embodiments being discussed below in detail. The edge configuration of the inner chamfers in a split blade retention race may cause damage to the blade shank by the split blade retention race, and result in a shortened lifespan for the blade. Relatively long outer chamfers at the splits that have a relatively shallow angle with respect to the race surface may reduce such damage to the blade shank by reducing edge compressive stress to the blade shank from the split blade retention race at the inner chamfers, as well as reducing rotation of the split blade retention race on the blade shank under load. Due to the length of the outer chamfers, the split blade retention race allows a maximum of 3 balls to be unloaded simultaneously on the outer chamfers at the splits. The length of the outer chamfers ensures that a loaded ball bearing is located a defined distance from the edge of the split, such that the compressive stress by the split blade retention race on the blade shank may be near zero. A curved outer radius is also located between an outer chamfer and the race surface; a ball bearing becomes unloaded after the ball bearing passes over the curved outer radius and onto the outer chamfer.

A curved inner radius located at a defined distance from the split, between an inner chamfer and the portion of the split blade retention race that is adjacent to the blade shank, ensures that there are no sharp edges contacting the blade shank. This distance between the curved inner radius and the split ensures that the stress is near zero at the last contact location between the split blade retention race and the blade shank. For example, if the length of the inner chamfer length and radius were the same as the outer chamfer length and radius, the load from a ball bearing on an outer chamfer would transfer directly downwards through the split blade retention race to the tangent point where the edge of the inner radius on the split blade retention race touches the blade shank. However, reducing the ratio of the length of inner chamfer to the length of the outer chamfer has the effect of reducing the load to near zero at this tangent point. The outer chamfer has a length that is longer than a length of the inner chamfer. In some embodiments the length of an outer chamfer may be about 4 times the length of an inner chamfer.

Figure 1:
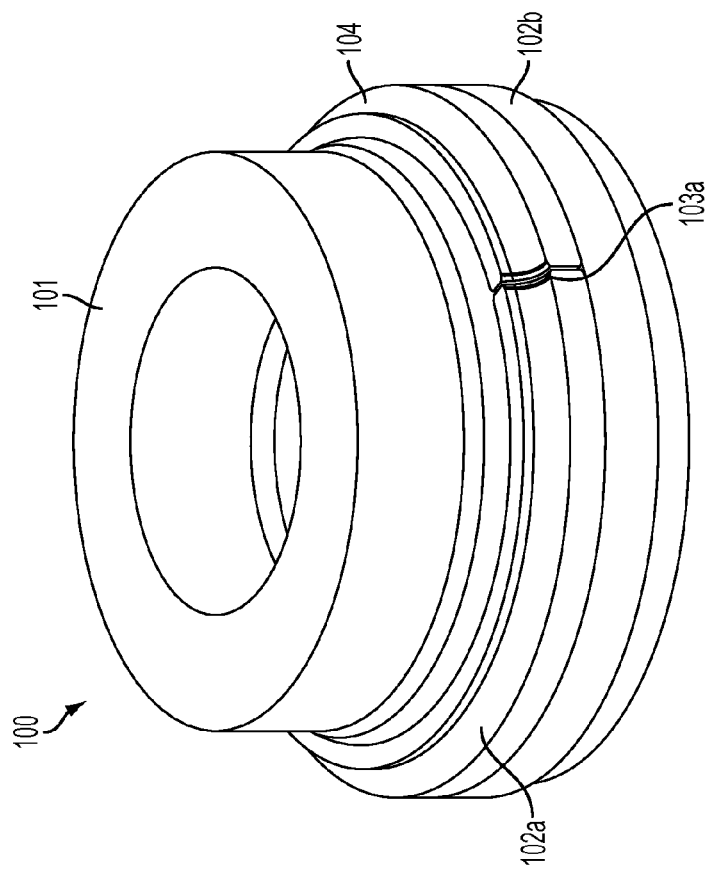
FIG. 1 illustrates an embodiment of a blade shank assembly for an aircraft propeller blade including a split blade retention race.

FIG. 1 shows an embodiment of a blade shank assembly 100 for insertion into a blade receiving socket (not shown) of an aircraft propeller. The blade shank assembly 100 includes blade shank 101 and split blade retention race 102a-b. Split 103a is located between the sections of the split blade retention race 102a-b. The edges of split blade retention race 102a-b at the split 103a each include an inner chamfer on the internal side, adjacent to the blade shank 101, and an outer chamfer on the external side, adjacent to the race surface 104 of the split blade retention race 102*a-b*. Ball bearings (shown below with respect to FIGS. 4A-6) are located on the race surface 104.

Figure 2:
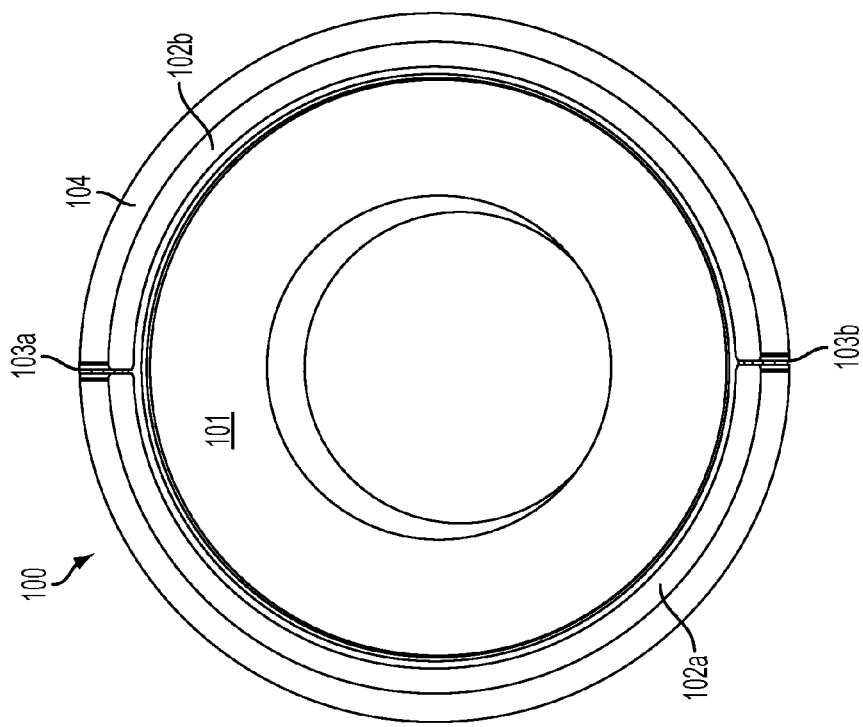
FIG. 2 illustrates a top view of an embodiment of a split blade retention race.

FIG. 2 shows a top view of the blade shank assembly 100, including blade shank 101 and split blade retention race 102*a-b*. Ball bearings move on the race surface 104 of split blade retention race 102*a-b*, and pass over splits 103*a-b*. Splits 103*a-b* are located between the sections of the split blade retention race 102*a-b*, and are perpendicular to the race surface 104. A ball bearing that is located on an outer chamfer within a calculated distance of a split 103*a-b* is unloaded. The configuration of the splits 103*a-b* in split blade retention race 102*a-b* is such that a maximum of three ball bearings are unloaded simultaneously. The remaining the ball bearings are located on the race surface 104 and share the load.

Figure 3:
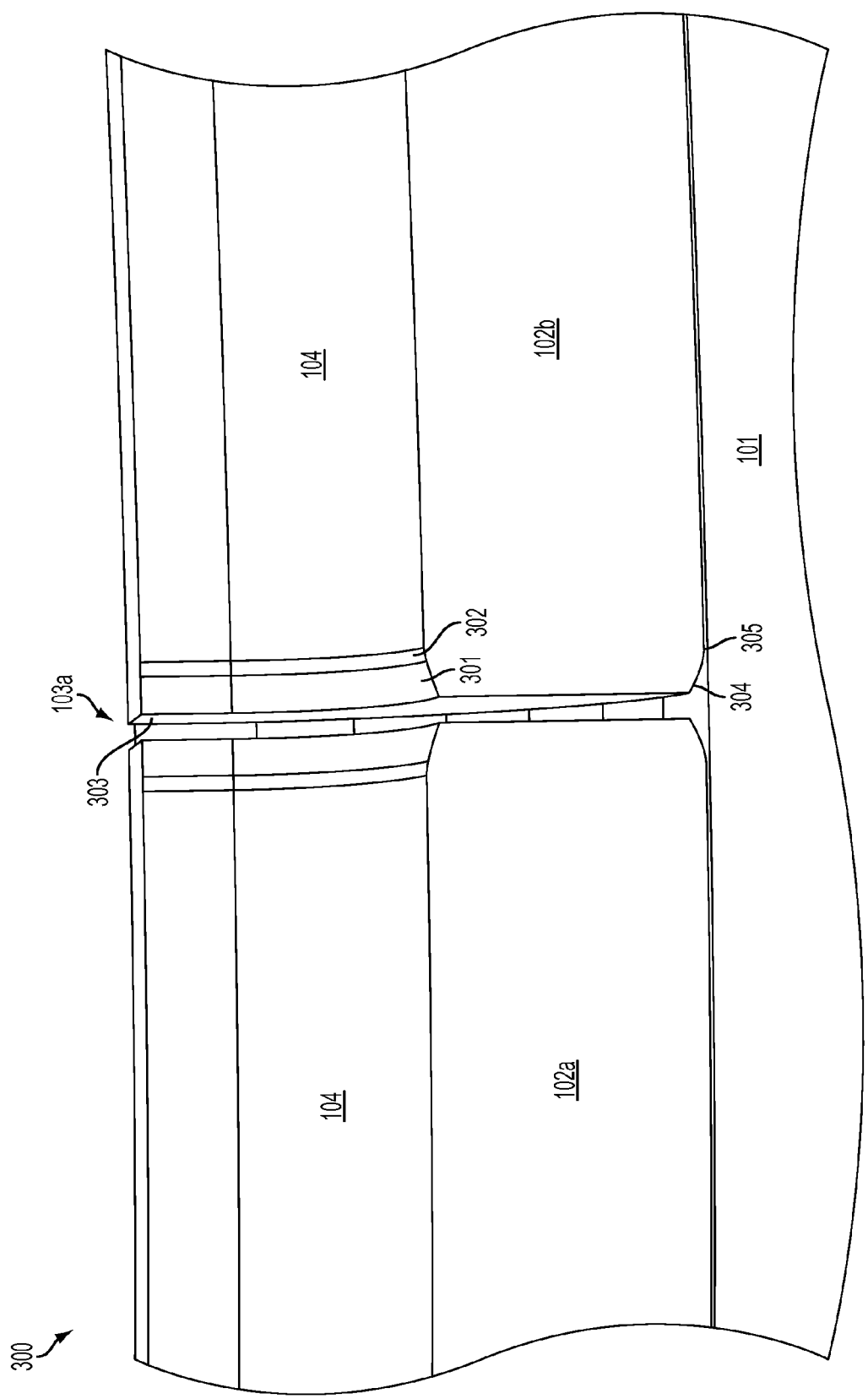
FIG. 3 illustrates a detailed side view of an embodiment of a blade shank with a split blade retention race at a split.

FIG. 3 shows a side view 300 of a blade shank 101 and a split blade retention race 102*a-b* at a split 103*a*. Race surface 104 is the surface on which the ball bearings are held. The edge geometry of split blade retention race 102*b* at split 103*a* includes an outer chamfer 301, outer radius 302, split surface 303, inner chamfer 304, and inner radius 305; the edge geometry of edge geometry of split blade retention race 102*a* corresponds to that of split blade retention race 102*b*. Outer chamfer 301 comprises a straight surface that is angled back from split surface 303 towards race surface 104, such that there is a dip in the race surface 104 adjacent to the split 103*a*. Outer chamfer 301 has a relatively shallow angle with respect to race surface 104, about 5 degrees in some embodiments. A curved outer radius 302 joins with outer chamfer 301 to race surface 104. Split surface 303 of section 102*b* of the split blade retention race 102*a-b* is located inside of split 103*a*, and directly faces and is parallel to a corresponding split surface on the other section 102*a* of the split blade retention race 102*a-b* on the other side of the split 103*a*. Inner chamfer 304 comprises a straight surface that is angled back from split surface 303 to an inner surface of the split blade retention race that is adjacent to the blade shank 101. A curved inner radius 305 joins the inner chamfer 304 to the surface of the split blade retention race 102*a-b* that is adjacent to blade shank 101.

Figure 4C:
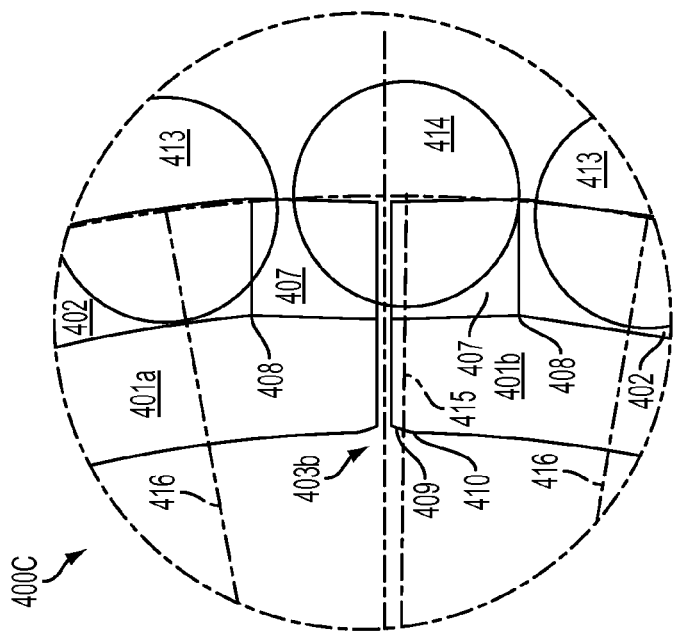
FIGS. 4B-C illustrate detailed views of the split blade retention race of FIG. 4A at the splits.
Figure 4B:
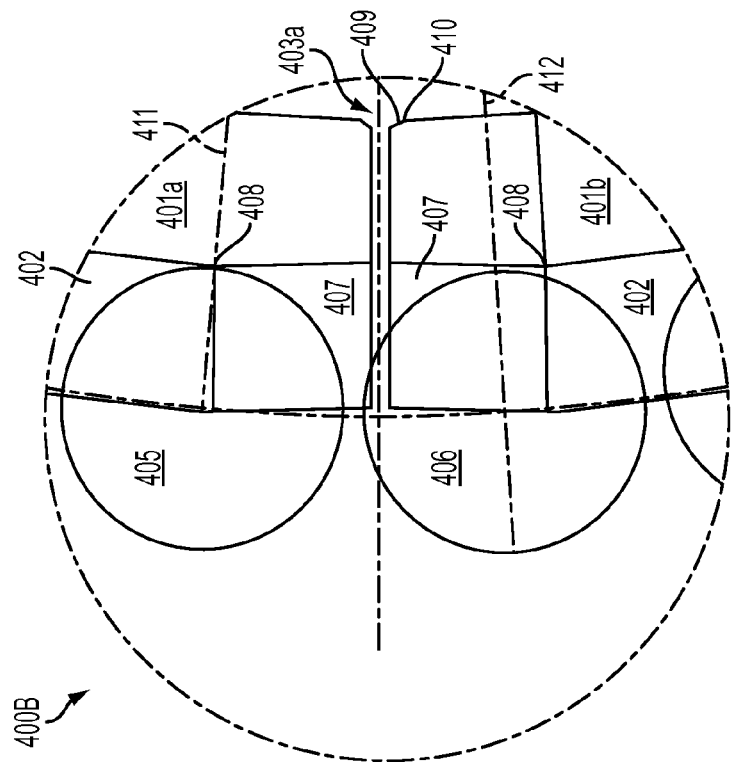

FIG. 4A shows a top view 400A of a split blade retention race 401*a-b* with splits 403*a-b*. Ball bearings, such as ball bearings 404, are located on the race surface 402 of the split blade retention race 401*a-b*. Due to the configuration of splits 403*a-b*, up to a maximum of 3 ball bearings may be unloaded on splits 403*a-b* simultaneously. In the embodiment of FIG. 4A, assuming that the ball bearings are moving counter-clockwise on the race surface 402, one ball bearing is unloaded at split 403*a*, one ball bearing is on the verge of becoming unloaded at split 403*a*, and one ball bearing is unloaded at split 403*b*. A detailed view 400B of split 403*a* is shown in FIG. 4B, and a detailed view of split 403*b* is shown in FIG. 4C. In detailed view 400B of FIG. 4B, the outer chamfers 407 have a relatively long, shallow angle with respect to race surface 402. Center load line 411 shows the load path of ball bearing 405 on the outer radius 408, and center load line 412 shows the load path of ball bearing 406 on the outer chamfer 407. Inner radii 410 and inner chamfers 409 are located at the bottom of the split 403*a*. As shown in FIG. 4B, ball bearing 405 is located on an outer radius 408, such that ball bearing 405 is currently loaded, but is on the verge of becoming unloaded on the outer chamfer 407. A ball bearing is not unloaded when it is located on outer radius 408, due to the compressive deflection of the ball on the race surface 402. Ball bearing 406 is located on the surface of an outer chamfer 407, and is unloaded. As ball bearings 405 and 406 move downward, ball bearing 405 becomes unloaded as it moves from outer radius 408 to outer chamfer 407, and the ball bearings 405 and 406 are then both unloaded until ball bearing 406 reaches outer radius 408. In detailed view 400C of FIG. 4C, ball bearing 414 is located on an outer chamfer 407 and is unloaded, as indicated by center load line 415, while ball bearings 413 are located on the race surface 402 and are loaded on the race surface 402, as indicated by center load lines 416. Inner radii 410 and inner chamfers 409 are located at the bottom of the split 403*b*. The outer radii 408 may have a curvature that is about twice a curvature of the inner radii 410 in some embodiments.

Figure 5:
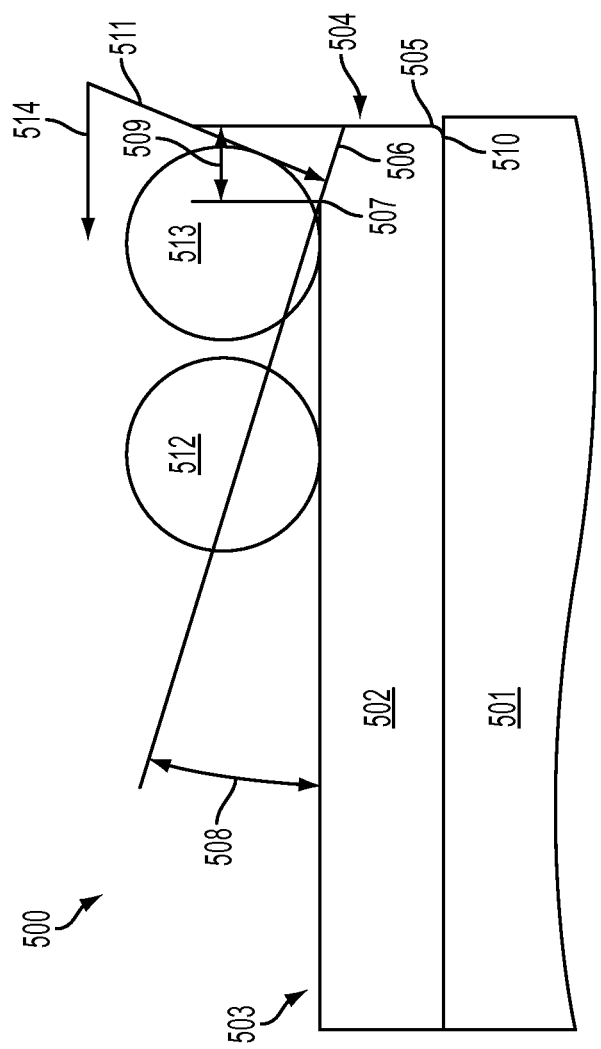
FIG. 5 illustrates a side view of an embodiment of a split blade retention race.

FIG. 5 illustrates a side view 500 of an embodiment of a split blade retention race 502 on a blade shank 501. Ball bearings 512 and 513 are located on race surface 503 of split blade retention race 502, and are loaded. Outer radius 507 and outer chamfer 506 are located between race surface 503 and split surface 504. Inner chamfer 505 and inner radius 510 are located between split surface 504 and the portion of split blade retention race 502 that is adjacent to blade shank 501. Angle 508 shows the angle of outer chamfer 506 with respect to the race surface 503, which is relatively small (about 5 degrees in some embodiments), and distance 509 shows the length of outer chamfer 506, which may be relatively long, due to the shallow angle 508, so as to reduce stress at the point where the inner radius 510 of split blade retention race 502 comes into contact with the blade shank 501. When a loaded ball bearing is located on a portion of the outer chamfer 506, load line 511 indicates the direction of the normal load from that ball bearing onto the outer chamfer 506, and load component 514 indicates the rotational load, which causes rotation of the split blade retention race 502 on the blade shank 501 and therefore should be reduced. The relatively shallow angle 508 of the outer chamfer 506 reduces the rotation of the split blade retention race 502 due to the rotational load indicated by load component 514, thus reducing wear from the split blade retention race 502 on the blade shank 501. The outer radii 507 may have a curvature that is about twice a curvature of the inner radii 510 in some embodiments. The outer chamfer 506 has a length that is longer than a length of the inner chamfer 505; the outer chamfer 506 may have a length that is about 4 times a length of the inner chamfer 505 in some embodiments.

Figure 6:
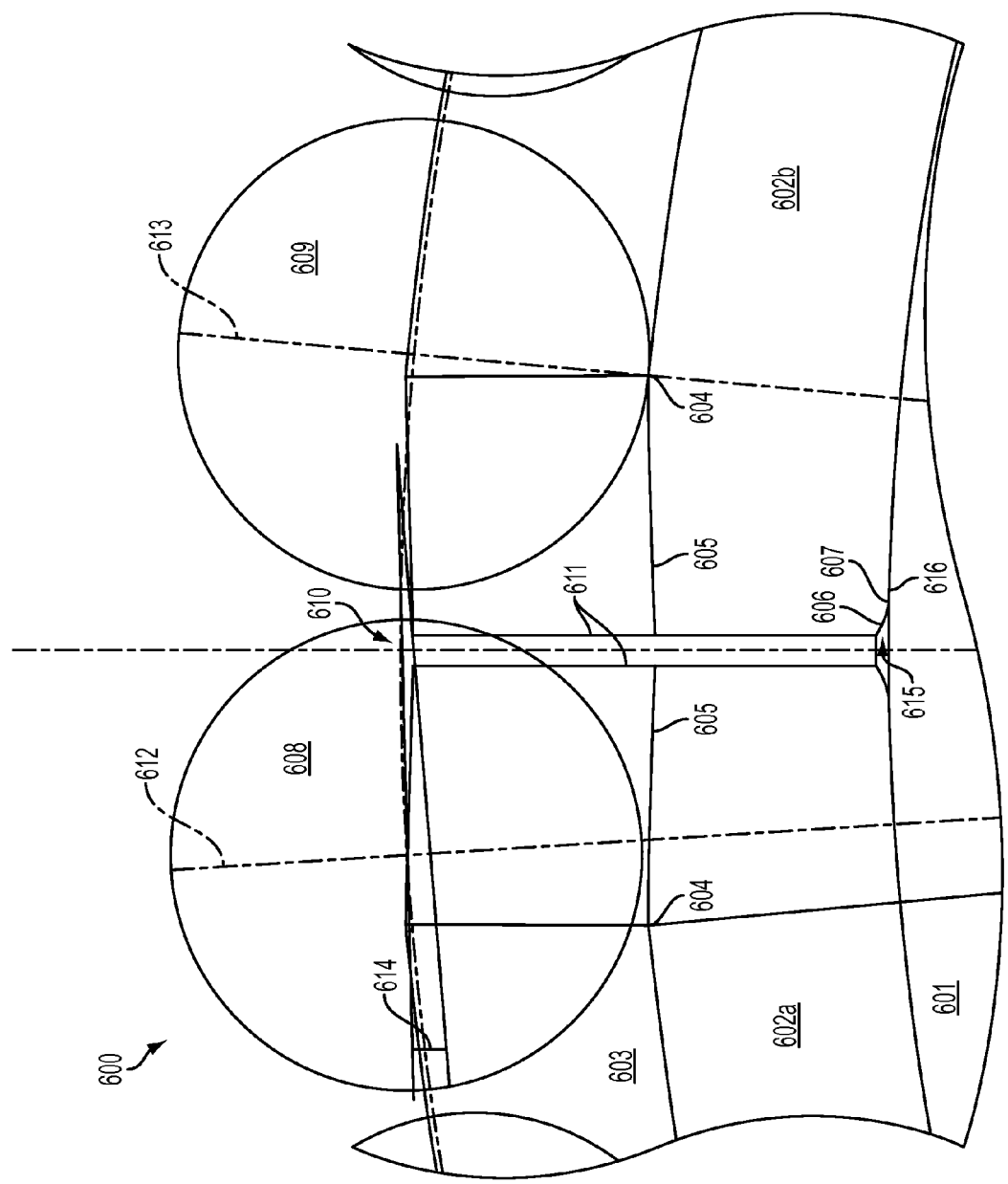
FIG. 6 illustrates a detailed view of an embodiment of a split blade retention race.

FIG. 6 illustrates a detailed view 600 of an embodiment of a split blade retention race. Split blade retention race 602*a-b* is located on blade shank 601, and includes race surface 603. Split 610 is perpendicular to race surface 603. At split 610, both sections of split blade retention race 602*a-b* include outer radii 604, outer chamfers 605, split surfaces 611, inner chamfers 606, and inner radii 607. In FIG. 6, ball bearing 608 is located on outer chamfer 605 and is unloaded, as indicated by center load line 612. Ball bearing 609 is located on outer radius 604 and is on the verge of becoming unloaded on the outer chamfer 605, depending on the compressive deflection of the race surface 603 under load. As the ball bearing 608 and 609 move to the left, both of ball bearings 608 and 609 will be unloaded on split 610. Angle 614 shows the angle of outer chamfer 605 with respect to the race surface 603, and is relatively shallow (in some embodiments, about 5 degrees). The length of an outer chamfer 605 (as is illustrated by distance 509 of FIG. 5) is longer than the length 615 of the inner chamfer 606; the outer chamfer 605 may be 4 times longer than the inner chamfer 606 in some embodiments. Inner radius 607 joins the inner chamfer 606 to the surface of the split blade retention race 602*a-b* that is adjacent to blade shank 601, and is tangent to the blade shank 601 at point 616. The load at point 616 from the split blade retention race 602*b* on the blade shank 601 is near zero, and no sharp edge contacts the blade shank 601 at point 616. The outer radii 604 may have a curvature that is about twice a curvature of the inner radii 607 in some embodiments.

The technical effects and benefits of exemplary embodiments include reduction of blade shank damage due to blade race split configuration as well as reduction in wear in the split race edges.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A blade shank assembly for an aircraft propeller blade, comprising:
    a blade shank; and
    a split blade retention race encircling the blade shank, the split blade retention race comprising two sections separated by two splits, the two splits being perpendicular to a race surface of the split blade retention race, wherein the split blade retention race comprises:
        an inner chamfer located between a surface of the split blade retention race that is adjacent to the blade shank and a split surface of the split blade retention race at each of the two splits; and
        an outer chamfer located between the race surface of the split blade retention race and the split surface at each of the two splits.

2. The blade shank assembly of claim 1, further comprising a plurality of ball bearings located on the race surface of the split blade retention race.

3. The blade shank assembly of claim 1, wherein the split surface comprises a surface that is located on the split blade retention race inside of a split, such that a first split surface of a first section is directly opposite and parallel to a corresponding second split surface of a second section across the split.

4. The blade shank assembly of claim 1, wherein the inner chamfer comprises a straight surface that is angled back from the surface of the split blade retention race that is adjacent to the blade shank to the split surface of the split blade retention race.

5. The blade shank assembly of claim 4, further comprising an inner radius comprising a curved surface that is located between the inner chamfer and the surface of the split blade retention race that is adjacent to the blade shank.

6. The blade shank assembly of claim 1, wherein the outer chamfer comprises a straight surface that is angled back from the race surface of the split blade retention race to the split surface.

7. The blade shank assembly of claim 6, further comprising an outer radius comprising a curved surface that is located between the outer chamfer and the race surface of the split blade retention race.

8. The blade shank assembly of claim 7, wherein a ball bearing of a plurality of ball bearings on the race surface is loaded based on a center load line of the ball bearing being located on the race surface, and fully unloaded based on a center load line of the ball bearing being located on one of an outer chamfer and a split.

9. The blade shank assembly of claim 8, wherein up to a maximum of three ball bearing of the plurality of ball bearings are unloaded simultaneously.

10. The blade shank assembly of claim 9, wherein one of the three unloaded ball bearings is located at a first split of the two splits, and two of the three unloaded ball bearings are located at a second split of the two splits.

11. The blade shank assembly of claim 1, wherein the outer chamfer has an angle of about 5 degrees with respect to the race surface.

12. The blade shank assembly of claim 1, wherein a length of the outer chamfer is longer than a length of the inner chamfer.

13. The blade shank assembly of claim 12, wherein the length of the outer chamfer is about 4 times the length of the inner chamfer.

14. A split blade retention race for a blade shank assembly for an aircraft propeller blade, comprising:
    a race surface;
    an inner surface, the inner surface being configured to be located adjacent to a blade shank in the blade shank assembly;
    a split surface, the split surface being perpendicular to the race surface and to the inner surface;
    an inner chamfer, wherein the inner chamfer is angled back from the split surface to the inner surface; and
    an outer chamfer, wherein the outer chamfer is angled back from the split surface to the race surface.

15. The split blade retention race of claim 14, wherein the race surface is configured to hold a plurality of ball bearings.

16. The split blade retention race of claim 14, wherein the inner chamfer comprises a straight surface, and further comprising an inner radius comprising a curved surface that is located between the inner chamfer and the inner surface; and
    wherein the outer chamfer comprises a straight surface, and further comprising an outer radius comprising a curved surface that is located between the outer chamfer and the race surface.

17. The split blade retention race of claim 14, wherein a curvature of the outer chamfer is about twice a curvature of the inner chamfer.

18. The split blade retention race of claim 14, wherein a length of the outer chamfer is longer than a length of the inner chamfer.

19. The split blade retention race of claim 18, wherein the length of the outer chamfer is about 4 times the length of the inner chamfer.

20. The blade shank assembly of claim 14, wherein the outer chamfer has an angle of about 5 degrees with respect to the race surface.

* * * * *